March 29, 1955     A. W. EDWARDS     2,705,295
CIRCUIT INTERRUPTER CONTROL SYSTEM
Filed Jan. 29, 1952     3 Sheets-Sheet 1
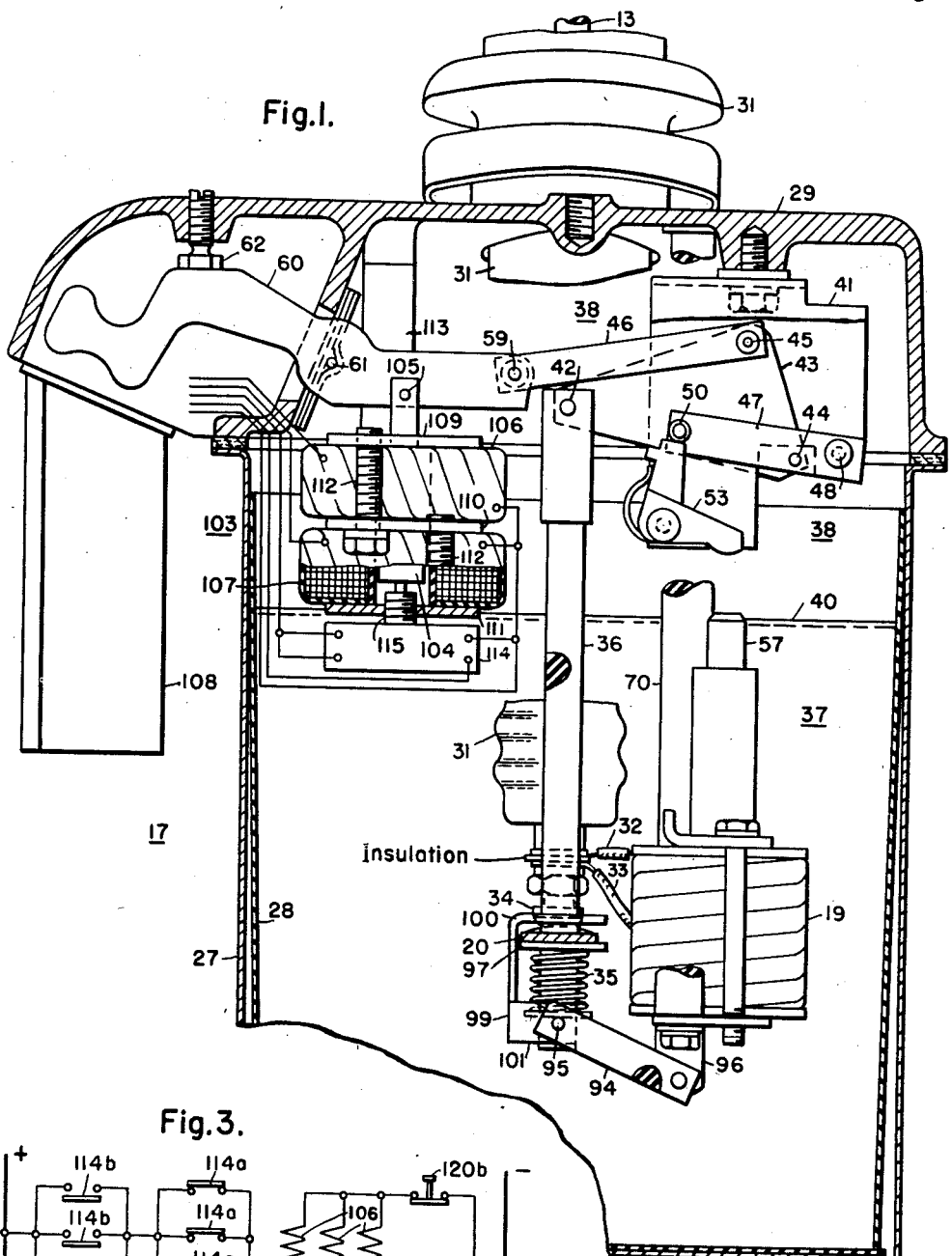
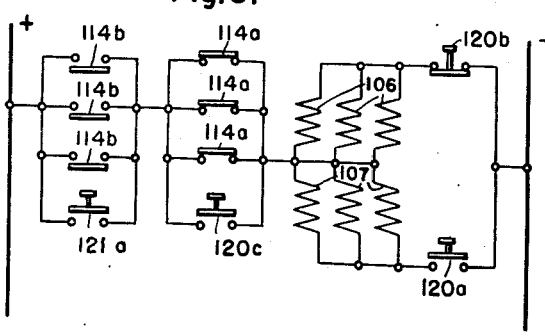
INVENTOR
Andrew W. Edwards.
BY
Ralph H. Swingle
ATTORNEY March 29, 1955  A. W. EDWARDS  2,705,295
CIRCUIT INTERRUPTER CONTROL SYSTEM
Filed Jan. 29, 1952  3 Sheets-Sheet 3

WITNESSES:

INVENTOR
Andrew W. Edwards.
BY
Ralph H. Swingle
ATTORNEY

United States Patent Office 2,705,295
Patented Mar. 29, 1955

2,705,295

CIRCUIT INTERRUPTER CONTROL SYSTEM

Andrew W. Edwards, East McKeesport, Pa., assignor to Westinghouse Electric Corporation, East Pittsburgh, Pa., a corporation of Pennsylvania Application January 29, 1952, Serial No. 268,713

7 Claims. (Cl. 317—46)

My invention relates generally to circuit interrupters, and it has reference in particular to a control system for using a plurality of single-pole sectionalizing switches in a polyphase electric circuit.

Sectionalizing switches which count a predetermined number of interruptions of an overcurrent by a reclosing circuit breaker or other such device have been developed for use on single phase circuits. While integrated three phase sectionalizing switches have also been developed, it is not always economically expedient to justify their use on some of the lighter loaded circuits, and some less expensive arrangement may be desirable. Since the use of separate and unrelated single-pole sectionalizing switches can not be tolerated in a polyphase system, because of the danger of opening by one circuit of a three-phase system, it is necessary to insure that when single-pole sectionalizing switches are used in such a circuit, all of the switches are opened, in the event that one of the sectionalizing switches opens in response to a predetermined number of circuit interruptions by the reclosing circuit breaker in its phase circuit.

Acordingly, it is one object of my invention to provide in a new and novel manner for utilizing three separate single-phase sectionalizing switches in a three-phase circuit, and for insuring opening of all the switches in the event that one of them opens.

Another object of my invention is to provide for using electrical operating means for both opening and closing each of the single-phase sectionalizing switches in a polyphase circuit, and for utilizing a plurality of control switches for electrically operating the other sectionalizing switches whenever one of the sectionalizing switches opens.

Yet another object of my invention is to provide each of the single-pole sectionalizing switches used in a polyphase system with operating windings for both opening and closing the switches individually, and for providing the switches with auxiliary switches which may be connected to effect energization of the operating windings to operate all of the sectionalizing switches whenever one of them operates.

It is also an important object of my invention to provide each of the several single-pole sectionalizing switches in a polyphase system with an auxiliary switch operable in accordance with the sectionalizing switch operating mechanism, and electrical operating means for actuating the mechanism to both open and close the sectionalizing switch, and for so connecting the auxiliary switches in conjunction with "trip" and "close" control switches, as to provide for operating all of the sectionalizing switches whenever one of them either opens or closes.

Other objects will in part be obvious, and will in part be explained hereinafter.

In practicing my invention in accordance with one of its embodiments, three single-pole sectionalizing switches each having separable contacts operated by an operating mechanism which is normally latched to maintain the contacts closed and which is released by electroresponsive counting means in response to a predetermined number of interruptions of an overcurrent in the circuit are used one in each of the three circuits of a three-phase system. Solenoid operating means having "close" and "trip" windings are used to actuate the operating mechanisms of the switches to close and open the contacts. Auxiliary switches operable in response to the operating positions of the sectionalizing switches are used in conjunction with separate "trip" and "close" control switches to energize the trip and closing windings of the other switches whenever one of the sectionalizing switches is operated either manually or by its counting means, so as to always effect operation of all of the sectionalizing switches to the same operating position.

For a more complete understanding of the nature and scope of my invention, reference may be made to the following detailed description, which may be read in connection with the accompanying drawings in which:

Figure 1 is a substantially central vetrical sectional view of a sectionalizing switch embodying the invention in one of its forms;

Fig. 3 is a simplified schematic diagram showing the connections of the auxiliary switches, operating windings and control switches in the system of Fig. 2.

Figure 2:
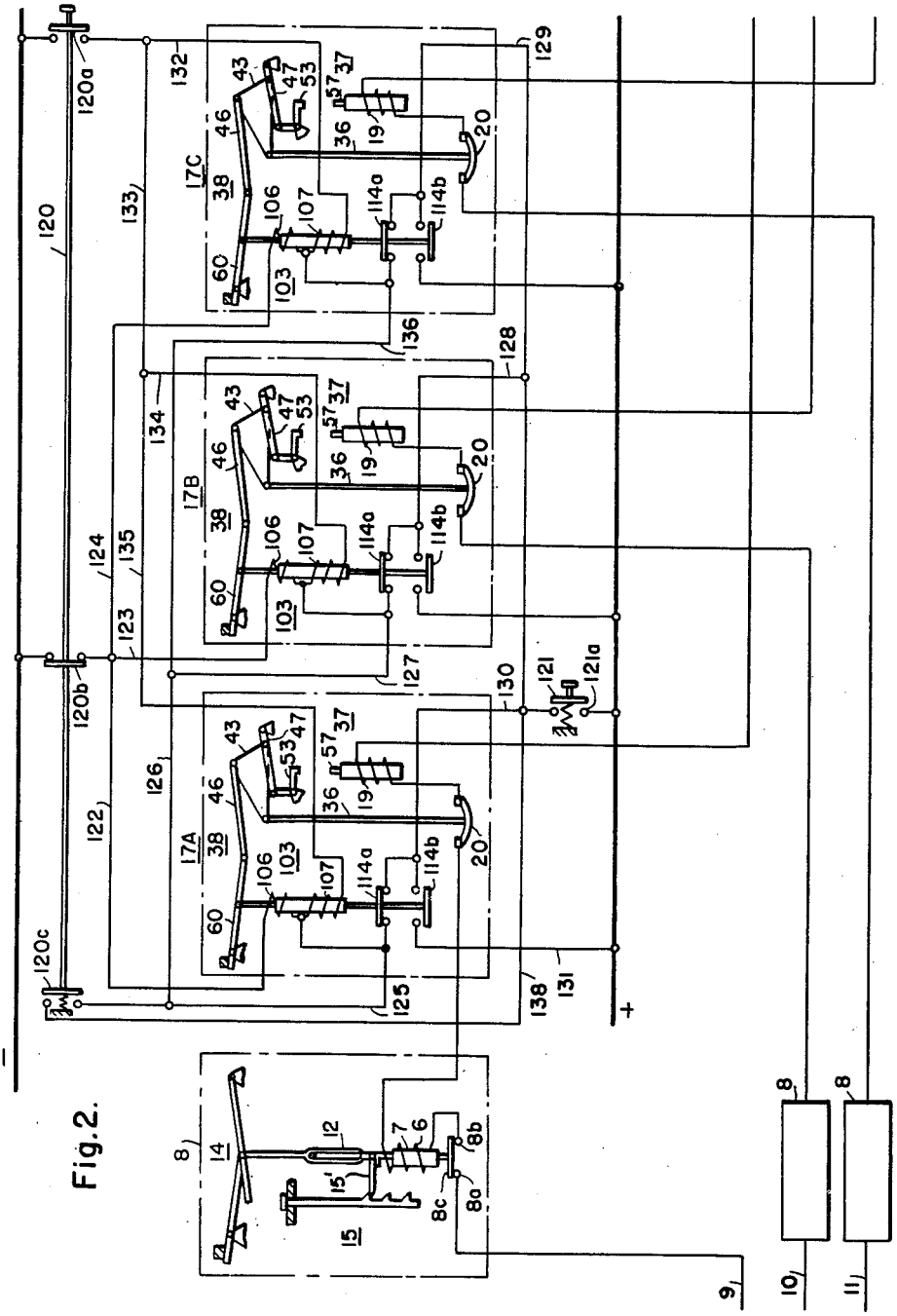
Fig. 2 is a diagrammatic view of a three phase system illustrating an application of a plurality of sectionalizing switches such as shown in Fig. 1 in an embodiment of the invention.
Figure 4:
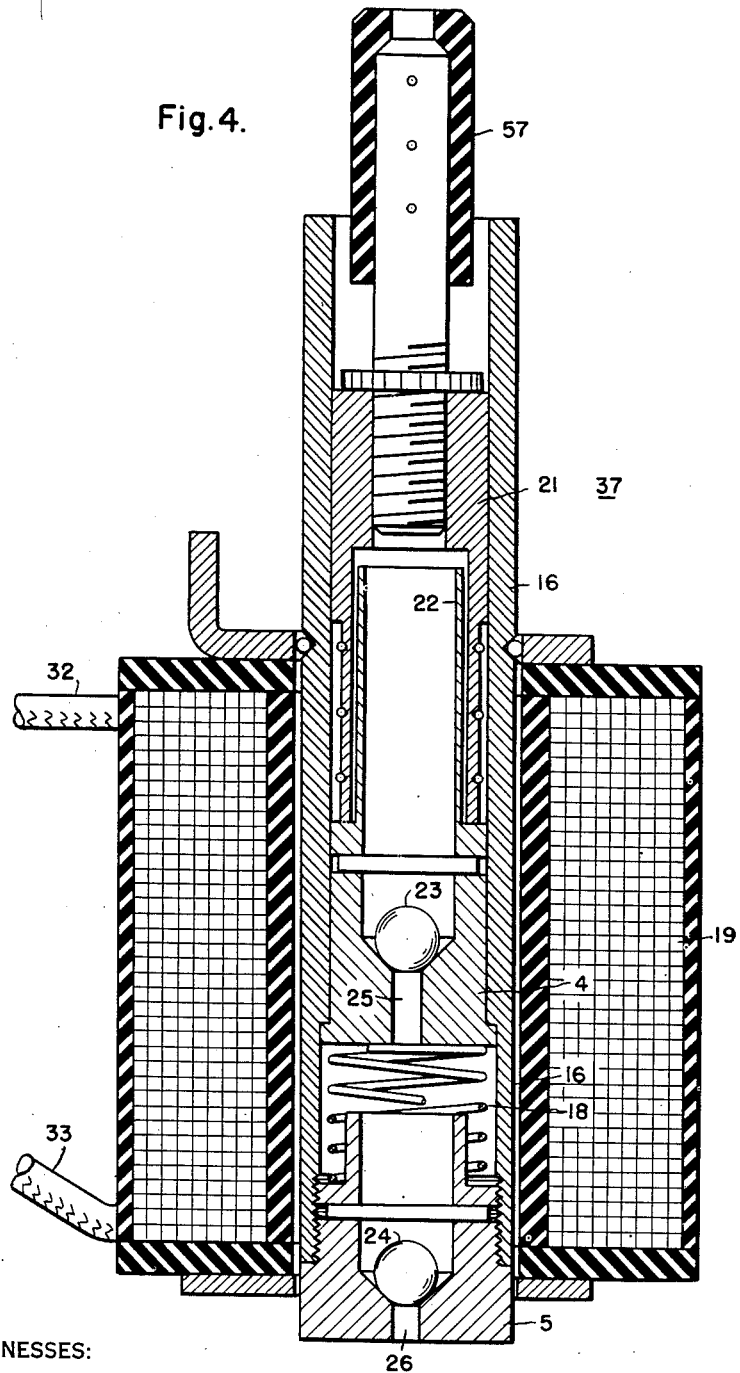
Fig. 4 is an enlarged cross-sectional view of the counter.

Referring particularly to Fig. 1 of the drawings, it will be seen that my invention may be embodied in a switch which is generally of the type disclosed in the copending application Serial No. 196,508 of James M. Wallace and Andrew W. Edwards, which was filed on November 18, 1950, entitled Circuit Interrupters, and is assigned to the assignee of the present invention. As therein shown, a switch 17 is enclosed within a metal tank 27 which is provided with an insulating liner 28 and is surmounted by a top casting 29. An incoming conductor 13 enters through an insulating bushing 31 which terminates inside the tank. The circuit then continues through a conductor 32 to the operating coil 19 of a counter 37, and by way of a conductor 33 back underneath the bushing 31, and thence to a terminal contact 34 which constitutes one of the stationary contacts of the sectionalizing switch. The sectionalizing switch has two of these bushings, each with its lead passing through the bushing, and each bushing terminates at its bottom in one of the stationary contacts of the sectionalizing switch. Since Fig. 1 shows an approximately central section through the switch, the second stationary contact and bushing are not visible. The stationary contacts may be connected by a movable contact 20 which is shown as a contact bar or bridge which presses up against the underside of the stationary contact 34 and the other contact in the closed position of the switch to provide a circuit between them, and which is lowered by gravity upon the release of a pull rod 36, which is shown in the form of an upwardly extending tube of insulating material provided with an operating mechanism designated generally by the numeral 38.

While the switch 17 can operate either in air or in an insulating fluid such as oil, it has been illustrated as having the contacts 20 and 34 immersed in oil 40, which is contained in the tank 27.

The operating mechanism 38 is generally mounted in a U-shaped frame 41 which is bolted to the underside of the top casting 29. The operating mechanism 38 may be regarded as starting with the movable contact 20 and including the upwardly extending insulating pull rod 36, the bottom end of which is connected to the movable contact by passing therethrough and being provided at the lower end with a spring 35 upon which the contact 20 rests. The upper end of the pull rod 36 is pivotally connected at 42 to a rocker member or lever 43, which is shown in its preferred form as a triangular plate having its base line almost horizontal with terminal pivot points 42 and 44 at the opposite ends thereof. The terminal pivot point 44 may be pivotally supported by a lever 47 which is pivotally connected to the frame 41 by a pivot 48. The apex of the triangular lever 43 may be pivotally connected by means of a pivot 45 to a link 46, which is in turn pivotally connected at 59 to the inner end of an operating handle 60. An intermediate point of the operating handle 60 is secured to a pivot support 61 on the top casting 29. The other end of the handle 60 engages a stop screw 62 which is carried on the underside of the top casting 29, and is disposed to maintain the levers 60 and 46 in an overcenter toggle relation with the pivot 59 slightly below a line joining the pivots 45 and 61. The lever 47 may be releasably maintained in the position shown by means of a bell crank lever 53, which is pivotally mounted on the frame 41 for normally supporting a roller 50 mounted on the free end of the lever 47.

The lower end of the pull rod 36 may be maintained in operating alignment by means of insulating guide links 94, which are pivotally supported at one end by means of brackets 96 secured to the lower ends of tubular insulators 70 depending from the top casting 29. The other ends of the links 94 may be connected to the lower end of the pull rod 36 by a pivot pin 95. A contact pressure increasing member 97 of a magnetic material may be disposed between the spring 35 and the contact 20 for increasing the contact pressure during the flow of overcurrents. An L-shaped guide 99 having an upper leg 100 with an opening to receive the pull rod and ears 101 adjacent the lower ends of its vertical leg through which the pin 95 passes, may be used to align the contact 20.

In order to provide for electrically operating the switch 17, electrical operating means 103 may be provided, comprising, for example, an electromagnet having an armature 104 pivotally connected to the lever 60 by a pivot 105 and having trip and close windings 106 and 107, respectively. These windings may be disposed between spaced apart plates 109, 110, and 111 preferably of magnetic material, and which may be secured by means of bolts 112 to each other and to support 113 which projects downwardly from the casting 29. The armature 104 is so disposed that when the upper winding 106 is energized, the armature will be pulled upwardly by magnetic flux in the gap between the upper plate 109 and the armature, so as to open the switch. When the lower winding 107 is energized, the armature is pulled downwardly by the flux in the air gap between the lower plates 111 and the armature, so as to close the switch. An auxiliary switch 114 having contact members normally open when the contacts 20 and 34 of the main switch are closed, and other contacts normally closed may be mounted on the lower plate 11 by means of a threaded boss 115 so as to be actuated by the armature 104 in accordance with the position of the operating mechanism 38. A junction box 108 may be mounted on the casting 29 for making connections to the windings 106 and 107 and the auxiliary switch 114.

Release of the bell crank latch member 53 may be effected by means of an electroresponsive counter 37 which may be supported from the insulating supports 70 with an actuating pin 57 located to actuate the bell crank lever 53 in a counterclockwise direction after a predetermined number of interruptions of a fault current through the sectionalizing switch by means of a reclosing circuit breaker or other such device connected between the sectionalizing switch and the source of electrical energy. The counter 37 may be identical with that described in the above-mentioned copending application of James M. Wallace and Andrew W. Edwards, and comprises generally an operating winding 19 which is connected by means of conductors 32 and 33 in series circuit with the contacts 20 and 34 of the sectionalizing switch for actuating a movable armature 4 toward a fixed core 5 of magnetic material in a tube 16 disposed within the coil 19 to compress a spring 18 therebetween in response to an overcurrent. A cap 21 of non-magnetic material is slidably mounted on an extension 22 of armature 14. Ball valves 23 and 24 are provided in conjunction with orifices 25 and 26 to obtain a one-way stepping action of the trip pin 57 upwardly in steps of a predetermined distance in response to each interruption of the overcurrent.

Referring to Fig. 2 of the drawings, it will be seen that a plurality of similar sectionalizing switches 17A, 17B and 17C are disposed to be connected, one in each of the three conductors 9, 10 and 11 of a three phase distribution system in series circuit relation with reclosing circuit breakers 8. Since the reclosing circuit breakers 8 are of a well known type such as disclosed in the copending application Serial No. 196,508 of James M. Wallace and entitled Circuit Interrupter, and assigned to the assignee of the present invention, only one of them is illustrated schematically, and it will be understood that the others may be of a similar type and that they may be suitably interconnected for three phase operation if desired. As shown, the reclosing circuit breaker 8 may comprise stationary contacts 8a and 8b connected by a bridging contact 8c, which may be actuated by an armature 7 having an operating winding 6 connected in series circuit with the conductor 9. The armature 7 is connected by means of a lost motion connection 12 to a toggle lever mechanism 14 which is disposed to be actuated by a counter 15 when it is sufficiently advanced by a pivotally mounted pawl 15' after a predetermined number of operations to open the contacts and lock them open.

As shown, each of the sectionalizing switches has its main moving contact 20 connected in series circuit with its respective line conductor. The operating mechanism 38 of each sectionalizing switch is provided with electroresponsive operating means 103 comprising a trip winding 106 and a close winding 107 for operating the handle 60 to actuate the lever 43 to open and close the contacts. The counter 37 has its operating winding 19 also connected in series with its respective line conductor so that armature 4 is repeatedly attracted to core 5 by an overcurrent and upon cessation thereof is returned after each pulse of overcurrent to the position shown by spring 18 to progressively advance cap 21 and trip pin 57 for actuating the releasable bell crank lever 53 to remove the support from the lever 47 and effect counterclockwise rotation of the lever 43 to open the contacts after a predetermined number of closely successive interruptions of an overcurrent by the reclosing circuit breaker 8.

In order to provide for coordinating the operation of all of the sectionalizing switches 17A, 17B and 17C, the trip windings and the closing windings may each be connected in a parallel circuit arrangement, as shown in Figs. 2 and 3 of the drawing. The normally closed auxiliary contacts 114a of the different auxiliary switches 114 may be connected in parallel circuit relation and in series with the parallel connections of the trip and closing windings. The normally open contact members 114b of the auxiliary switches may also be connected in a parallel circuit relation and in series with the parallel circuit arrangements of the normally closed contact members 114a and the trip and closing windings 106 and 107.

A manual control switch 120 having normally open contact members 120a and 120c and a normally closed contact member 120b, may be provided for controlling the connection of the trip and close windings of the sectionalizing switches to a source of electrical energy. For example, the normally closed contact member 120b may be connected in series with the parallel connection of the trip windings and a source of electrical energy, while the normally open contact member 120a may be connected in series with the parallel connection of the closing windings and a source of electrical energy. The normally open contact member 120c may be connected in parallel circuit relation with the parallel connection of the normally closed contact members 114a, to provide for manually closing the sectionalizing switches. A trip control switch 121 having a normally opened contact 121a may be connected in parallel circuit relation with the normally open contact members 114b of the auxiliary switches to provide for tripping the sectionalizing switches.

With the sectionalizing switches in the closed operating position as shown, the reclosing circuit breaker 8 in the conductor 9, for example, will be actuated upon the flow of an overcurrent to open its moving contact 8c and interrupt the current. Upon such interruption, the counter 37 of the sectionalizing switch 17A will be actuated upwardly one step. Immediately following opening of the contact 8c, the reclosing circuit breaker 8 recloses, and if the fault current still continues, the reclosing circuit breaker again opens. This action will be repeated for a predetermined number of times, for example, three times whereupon the trip pin 57 of the sectionalizing switch 17a will engage the bell crank lever 53 to operate it in a counterclockwise direction. This releases the lever 47, removing the support from the lever 43, so that the lever 43 drops and rotates in a counterclockwise direction, permitting the pull rod 36 to drop and open contact 20. At the same time, the toggle arrangement between levers 46 and 60 is broken, so that the lever 60 rotates in a counterclockwise direction. Contact member 114a of sectionalizing switch 17A thereupon opens and the associated contact member 114b closes. An energizing circuit is thereupon provided for the trip windings 106 of the sectionalizing switches 17A, 17B and 17C extending from the negative conductor through normally closed contact member 120b and conductors 122, 123, 124, trip windings 106, conductors 125, 126 and 127 in the case of the winding of switch 17A, contact members 114a of sectionalizing switches 17B and 17C, conductors 128 and 129, conductor 130, contact member 114b of sectionalizing switch 17A and conductor 131 to the positive terminal of the source. Sectionalizing switches 17B and 17C are thereupon actuated to the tripped position.

The sectionalizing switches may be reclosed by actuating the control switch 120 to close contact members 120a and 120c. Energizing circuits are thereupon provided for the three closing windings 107, extending from the negative conductor through contact member 120a, and conductors 132, 133, 134 and 135 through the closing windings 107 in parallel, and thence, by way of conductors 136, 127 and 125 through contact member 120c, to conductor 138, and through contact members 114b, to the positive conductor.

The sectionalizing switches may be electrically tripped by operating trip switch 121 to connect the trip windings 106 to the control source through contact members 114a and contact member 120b.

From the above description and the accompanying drawings, it will be seen that I have provided in a simple and effective manner for using separate single-pole sectionalizing switches in a polyphase system. By utilizing the features of my invention, a simple and inexpensive polyphase sectionalizing switch may be provided, utilizing single pole sectionalizing switches, and wherein all of the single pole sectionalizing switches are immediately opened in the event that one pole locks open in response to the continuation of a fault current, so as to prevent single phasing of the system. The several sectionalizing switches may be readily operated in unison, electrically by means of remote control switches or mechanically, to obtain simultaneous operation of all poles.

Since certain changes may be made in the above-described construction, and different embodiments of the invention may be made without departing from the scope and spirit thereof, it is intended that all the matter contained in the above description and shown in the accompanying drawings shall be considered as illustrative, and not in a limiting sense.

I claim as my invention:

1. In combination, a plurality of sectionalizing switches, each of said switches having separable contacts with an operating mechanism therefor and electroresponsive counting means advanceable to effect operation of said mechanism to separate said contacts in response to a predetermined number of pulses of an overcurrent, auxiliary switch means having contacts actuated by the mechanisms of the sectionalizing switches, electroresponsive means individual to each switch having a moveable part operatively connected with said separable contacts operable to effect separation and closing of the separable contacts of each sectionalizing switch, and circuit means including the contacts of the auxiliary switch means connecting the electroresponsive means for operating them to open the separable contacts of all the other sectionalizing switches when one of said sectionalizing switches opens.

2. In a control system for a plurality of sectionalizing switches each having a pair of separable contacts with releasable means for maintaining them in engagement and counting means operable in response to a predetermined number of interruptions of an overcurrent therethrough to effect release of said releasable means and effect separation of said contacts, electroresponsive means having a movable part operatively connected to separate and close said separable contacts of each switch, and auxiliary contact means associated with each switch operable in response to movement of the separable contacts of said each switch to effect operation of the electroresponsive means to open the other switches.

3. In a polyphase system, a single phase sectionalizing switch for each phase, said sectionalizing switch having separable contacts connected in circuit with said phase, an operating mechanism therefor, and counting means operable in response to a predetermined number of pulses of overcurrent to actuate said mechanism to open the separable contacts of its sectionalizing switch; electroresponsive means having a part connected to the operating mechanism for selectively opening and closing the contacts of each sectionalizing switch; and auxiliary contact means associated with each sectionalizing switch connected to be operable when one of the sectionalizing switches opens to provide operating circuits for the electroresponsive means of the sectionalizing switches for operating the other sectionalizing switches to open them.

4. In a control system for a plurality of sectionalizing switches, each of said switches having separable contacts, a releasable operating mechanism for opening and closing said contacts, and counting means operable in response to a predetermined number of pulses of a fault current flowing through said contacts to release said operating mechanism; solenoid operating means for each sectionalizing switch having an armature movable to operate the operating mechanism, auxiliary contact means operatively connected with the operating mechanism of each sectionalizing switch; and circuit means connecting the auxiliary contact means in a parallel circuit in series with a parallel circuit of the solenoid operating means of all the sectionalizing switches to provide an operating circuit for the operating means whenever one of the sectionalizing switches is operated.

5. In a control system for a plurality of sectionalizing switches, each having separable contacts biased apart with releasable means for maintaining them in engagement and electroresponsive counting means operable after a predetermined number of pulses of a fault current to actuate the releasable means to effect separation of the separable contacts; an auxiliary switch for each sectionalizing switch having contacts normally open when the separable contacts of its sectionalizing switch are closed, a control switch having normally open contacts, solenoid means individual to each sectionalizing switch having an armature connected for actuating an operating mechanism of each of the sectionalizing switches to separate its separable contacts, and circuit means including a parallel circuit connection of the control switch and the normally open contacts of the auxiliary switches for connecting the solenoid means to a source of electrical energy whenever one of the sectionalizing switches is operated.

6. In a control system for a plurality of sectionalizing switches, each having separable contacts biased apart, provided with manual operating means, and maintained in engagement by releasable means, and electroresponsive counting means operable in response to a predetermined number of pulses of overcurrent through the contacts of the sectionalizing switch to actuate the releasable means and effect separation of said contacts, solenoid means for each switch having an armature connected for actuating said manual operating means and including a tripping and a closing winding, a trip switch having normally open contacts, a closing switch having normally open and normally closed contacts, auxiliary switch means for each sectionalizing switch operable in response to movement of the contacts of the sectionalizing switch, said auxiliary switch means having contacts normally open and other contacts normally closed when the separable contacts are closed, circuit means connecting the trip switch in parallel circuit with the normally open contacts of the auxiliary switch means of the sectionalizing switches, other circuit means connecting the normally closed contacts of the auxiliary switch means of the sectionalizing switches in parallel circuit with a normally open contact of the closing switch, additional circuit means connecting the trip windings in parallel, another circuit means connecting the closing windings in parallel, a circuit connecting the trip windings to a source of electrical energy including a series connection of a normally closed contact of the closing switch, the trip windings, the normally closed contacts of the auxiliary switch means and the normally open contacts of the auxiliary switch means, an additional circuit connecting the closing windings to a source of electrical energy including a series connection of a normally open contact of the closing switch, the closing windings, the normally closed contacts of the auxiliary switch means and the normally open contacts of the auxiliary switch means.

7. In combination, a plurality of sectionalizing switches each having separable contacts biased apart and having an operating mechanism therefor which is held in a contact closed position by releasable means disposed to be actuated by an electroresponsive counter after a predetermined number of pulses of current above a predetermined value, solenoid means for each switch including an armature connected to the operating mechanism thereof and a trip winding and a closing winding for actuating the operating mechanism independently of the counter to open and close said contacts, auxiliary switch means for each sectionalizing switch having contacts normally open and other contacts normally closed when the separable contacts are closed, said auxiliary switch means being operable in response to movement of the operating mechanism, a trip switch having normally open contacts, a closing switch having normally open and normally closed contacts, and circuit means connecting the trip windings in parallel, another circuit means connecting the closing windings in parallel, circuit means connecting the trip switch in parallel circuit with the normally open contacts of the auxiliary switch means, another circuit means connecting the normally closed contacts of the auxiliary switch means in parallel circuit with a normally open contact of the closing switch, a circuit connecting the trip windings to a source of electrical energy including a series connection of a normally closed contact of the closing switch, the trip windings, the normally closed contacts of the auxiliary switch means and the normally open contacts of the auxiliary switch means, an additional circuit connecting the closing windings to a source of electrical energy including a series connection of a normally open contact of the closing switch, the closing windings, the normally closed contacts of the auxiliary switch means and the normally open contacts of the auxiliary switch means.

References Cited in the file of this patent

UNITED STATES PATENTS

| | | |
|---|---|---|
| 781,919 | Stone | Feb. 7, 1905 |
| 2,567,411 | Van Ryan | Sept. 11, 1951 |